US011168575B2

(12) United States Patent
Chuong et al.

(10) Patent No.: US 11,168,575 B2
(45) Date of Patent: Nov. 9, 2021

(54) HALO SEAL ACCESS WINDOW OPENINGS

(71) Applicant: UNITED TECHNOLOGIES CORPORATION, Farmington, CT (US)

(72) Inventors: Conway Chuong, Manchester, CT (US); Joey Wong, Enfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 292 days.

(21) Appl. No.: 16/195,626

(22) Filed: Nov. 19, 2018

(65) Prior Publication Data
US 2020/0157962 A1  May 21, 2020

(51) Int. Cl.
*F01D 11/02* (2006.01)
*F02C 7/28* (2006.01)
*F04D 29/12* (2006.01)
*F16J 15/44* (2006.01)

(52) U.S. Cl.
CPC ............. *F01D 11/025* (2013.01); *F02C 7/28* (2013.01); *F04D 29/122* (2013.01); *F16J 15/442* (2013.01); *F16J 15/445* (2013.01); *F05D 2220/32* (2013.01); *F05D 2240/55* (2013.01); *F05D 2260/30* (2013.01)

(58) Field of Classification Search
CPC .. F16J 15/16; F16J 15/43; F16J 15/442; F16J 15/445; F01D 11/001; F01D 11/025; F01D 11/16; F05D 2220/32; F05D 2220/321; F05D 2220/3212; F05D 2220/3213; F05D 2220/3215; F05D 2220/3217; F05D 2240/30; F05D 2240/36; F05D 2240/38; F05D 2240/57; F05D 2240/55; F02C 7/28; F04D 29/122
See application file for complete search history.

(56) References Cited

U.S. PATENT DOCUMENTS

| | | | |
|---|---|---|---|
| 2005/0242525 A1* | 11/2005 | Dahlke | F16J 15/028 277/605 |
| 2010/0171271 A1* | 7/2010 | Kung | F16J 15/43 277/410 |
| 2010/0213674 A1 | 8/2010 | Garrison | |
| 2013/0234399 A1* | 9/2013 | Justak | F16J 15/44 277/411 |

(Continued)

FOREIGN PATENT DOCUMENTS

| | | |
|---|---|---|
| EP | 0629799 | 12/1994 |
| EP | 3511526 | 7/2019 |

OTHER PUBLICATIONS

European Patent Office, European Partial Search Report dated Apr. 9, 2020 in Application No. 19198029.1.

(Continued)

*Primary Examiner* — Kristina R Fulton
*Assistant Examiner* — L. Susmitha Koneru
(74) *Attorney, Agent, or Firm* — Snell & Wilmer L.L.P.

(57) ABSTRACT

A seal ring for a non-contact seal may comprise an annular body comprising a first side surface, a second side surface, an outer surface, and an inner surface, and a plurality of window openings disposed in the annular body. The plurality of window openings may be configured to provide access to the seal for installation of a melting member to secure the seal shoes in an outboard direction during installation.

19 Claims, 8 Drawing Sheets

(56) References Cited

U.S. PATENT DOCUMENTS

| | | |
|---|---|---|
| 2015/0285152 A1 | 10/2015 | Hayford |
| 2016/0130963 A1 | 5/2016 | Wilson et al. |
| 2017/0051751 A1 | 2/2017 | Ackermann et al. |
| 2018/0045066 A1 | 2/2018 | Chuong |
| 2018/0058240 A1 | 3/2018 | Chuong et al. |

OTHER PUBLICATIONS

European Patent Office, European Search Report dated Jul. 16, 2020 in Application No. 19198029.1.

* cited by examiner

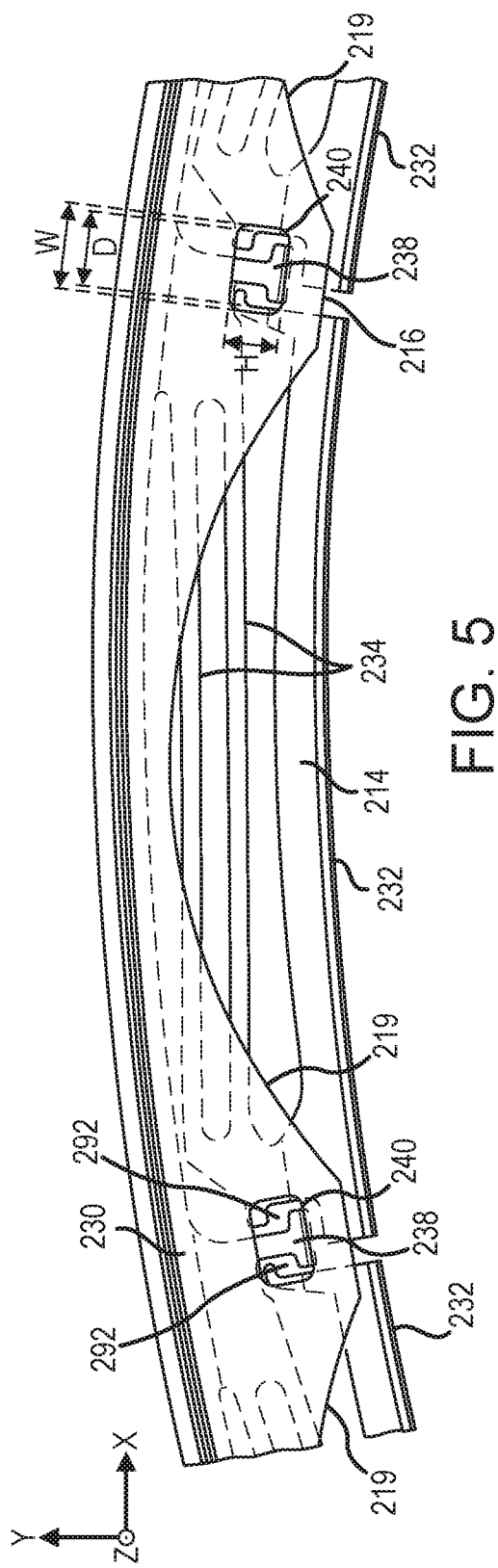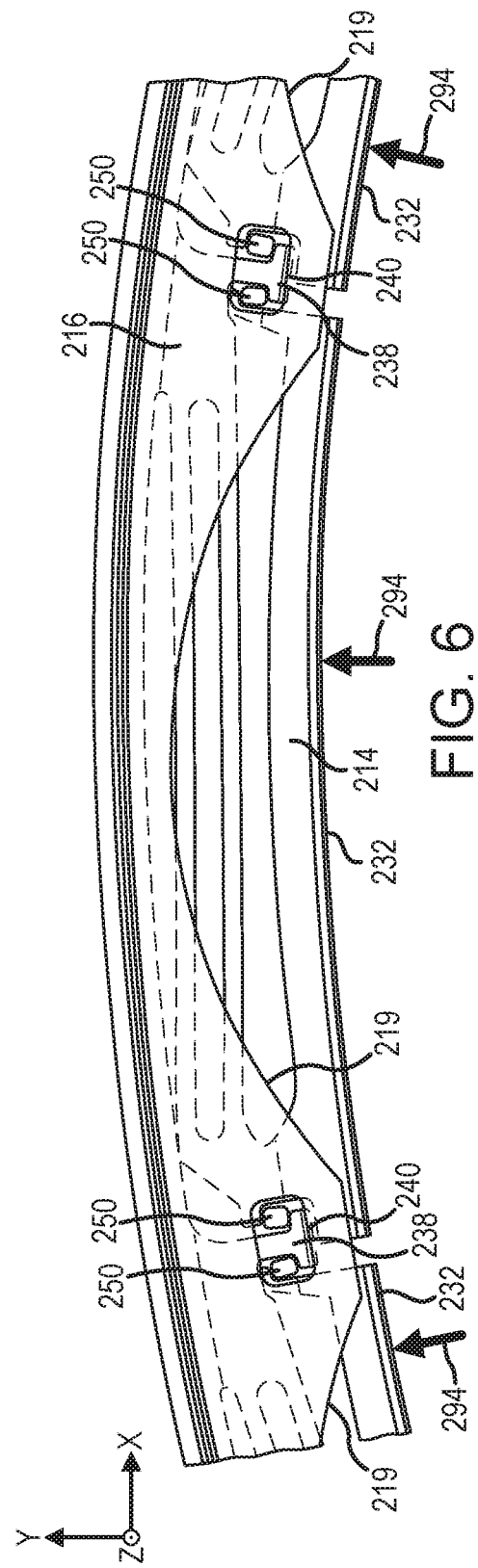

HALO SEAL ACCESS WINDOW OPENINGS

GOVERNMENT LICENSE RIGHTS

This invention was made with Government support awarded by the United States. The Government has certain rights in this invention.

FIELD

This disclosure relates generally to seal assemblies for rotating shafts, and more particularly for systems and methods for installing a non-contact seal.

BACKGROUND

Gas turbine engines typically include a fan delivering air into a compressor and through a bypass duct. The air is compressed in the compressor and delivered downstream into a combustion section where it is mixed with fuel and ignited. Products of this combustion pass downstream over turbine rotors, driving the turbine rotors to rotate. The turbine rotors in turn rotate the compressors and fan.

The fan and compressor are typically driven by the turbine rotors via shafts. Seals may be provided around the shafts. During engine assembly, the non-contact seal may have tight build gap clearance to the seal land. Tolerances of the parts and of assembly tools may cause this gap to reduce or be eliminated. This may result in damage to the non-contact seal shoes which may cause the seal to malfunction.

SUMMARY

A seal arrangement is disclosed, comprising a carrier ring, a seal disposed within the carrier ring, a seal ring disposed within the carrier ring and axially adjacent the seal, wherein the seal ring comprises an annular body comprising a first side surface, a second side surface, an outer surface, an inner surface, and a plurality of window openings disposed in the annular body.

In various embodiments, the plurality of window openings extends through the annular body from the first side to the second side.

In various embodiments, the seal ring further comprises a plurality of scalloped openings defined by the inner surface.

In various embodiments, the plurality of window openings includes a first window opening and a second window opening, and the plurality of scalloped openings includes a first scalloped opening and a second scalloped opening, wherein the first window opening is disposed circumferentially between the first scalloped opening and the second scalloped opening, and the second scalloped opening is disposed circumferentially between the first window opening and the second window opening.

In various embodiments, the seal comprises a plurality of stops, the plurality of window openings corresponding to the plurality of stops.

In various embodiments, the plurality of window openings is configured to provide access to a gap defined by the seal.

In various embodiments, the plurality of window openings is disposed circumferentially about the seal ring.

A seal ring for a non-contact seal is disclosed, comprising an annular body comprising a first side surface, a second side surface, an outer surface, and an inner surface, and a plurality of window openings disposed in the annular body, wherein the plurality of window openings is configured to provide access to the non-contact seal, whereby a melting element is moved through the plurality of window openings to the non-contact seal.

In various embodiments, the plurality of window openings extends through the annular body from the first side to the second side.

In various embodiments, the seal ring further comprises a plurality of scalloped openings defined by the inner surface.

In various embodiments, the plurality of window openings includes a first window opening and a second window opening, and the plurality of scalloped openings includes a first scalloped opening and a second scalloped opening, wherein the first window opening is disposed circumferentially between the first scalloped opening and the second scalloped opening, and the second scalloped opening is disposed circumferentially between the first window opening and the second window opening.

In various embodiments, the plurality of window openings corresponds to a plurality of stops of the non-contact seal.

In various embodiments, the plurality of window openings is sized in accordance with a distance between a first shoe and a second shoe of the non-contact seal.

In various embodiments, the plurality of window openings is disposed circumferentially about the seal ring.

A method for assembling a seal arrangement is disclosed, comprising applying heat to at least one of a carrier ring and a static support piece, disposing a seal arrangement into the static support piece, applying a force to a shoe of the seal in a radially outward direction, and moving a melting element through a window opening disposed in the seal ring and into a gap defined by the seal.

In various embodiments, the method further comprises moving the melting element into the gap.

In various embodiments, applying the force to the shoe moves the shoe to an outboard position.

In various embodiments, the melting element secures the shoe in the outboard position.

In various embodiments, the melting element comprises at least one of a wax material and a plastic material.

In various embodiments, the method further comprises removing the force from the shoe, wherein the melting element secures the shoe in the outboard position in response to the force being removed.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 5 illustrates a perspective view of the seal arrangement of FIG. 2A with the seal shoes in a neutral position, in accordance with various embodiments;

FIG. 6 illustrates a perspective view of the seal arrangement of FIG. 2A with the seal shoes in an outboard position, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the axis of rotation of a turbine engine. As used herein, "proximal" refers to a direction radially inward, or generally, towards the axis of rotation of a turbine engine.

As used herein, "snap" refers to the process of placement of a first cylindrical component into a second cylindrical component, such that the second cylindrical component circumferentially surrounds the first component, wherein the outer diameter (OD) of the first component is greater than or equal to the inner diameter (ID) of the second component. In various embodiments, the first component may be pressed into the second component, thereby reducing the OD of the first component to tightly fit into the second component. In various embodiments, the OD of the first component may be decreased by decreasing the temperature of the first component before placing the first component into the second component. In various embodiments, the ID of the second component may be increased by increasing the temperature of the second component before placing the first component into the second component.

A seal ring, as provided herein, may include an access window for installing a melting element to hold seal shoes in an outboard position.

Figure 1:
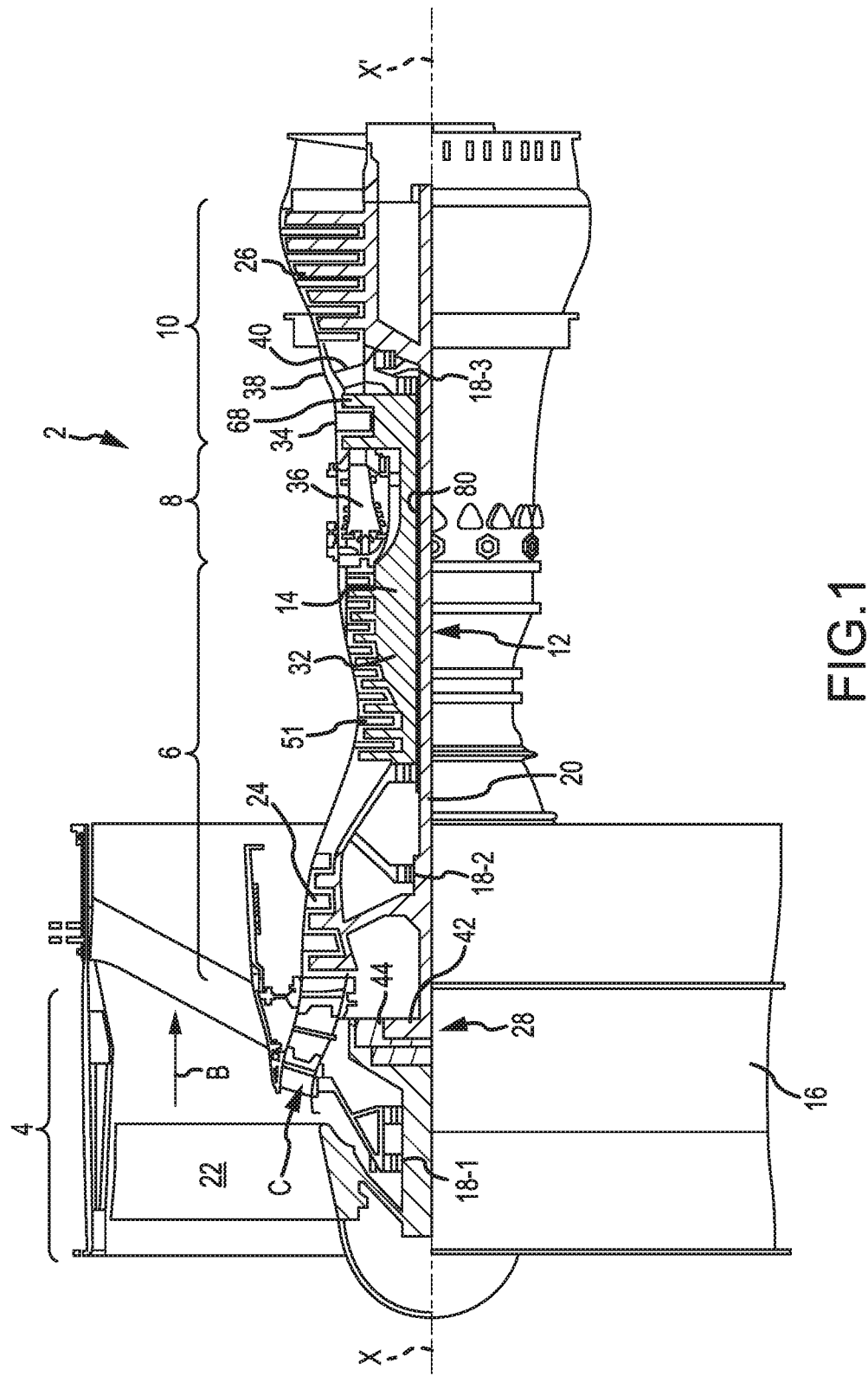
FIG. 1 illustrates a side cutaway view of a turbine engine, in accordance with various embodiments.

With reference to FIG. 1, an exemplary gas turbine engine 2 is provided, in accordance with various embodiments. Gas turbine engine 2 is a two-spool turbofan that generally incorporates a fan section 4, a compressor section 6, a combustor section 8 and a turbine section 10. Vanes 51 may be disposed throughout the gas turbine engine 2. In operation, fan section 4 drives air along a bypass flow-path B while compressor section 6 drives air along a core flow-path C for compression and communication into combustor section 8 then expansion through turbine section 10. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 4:
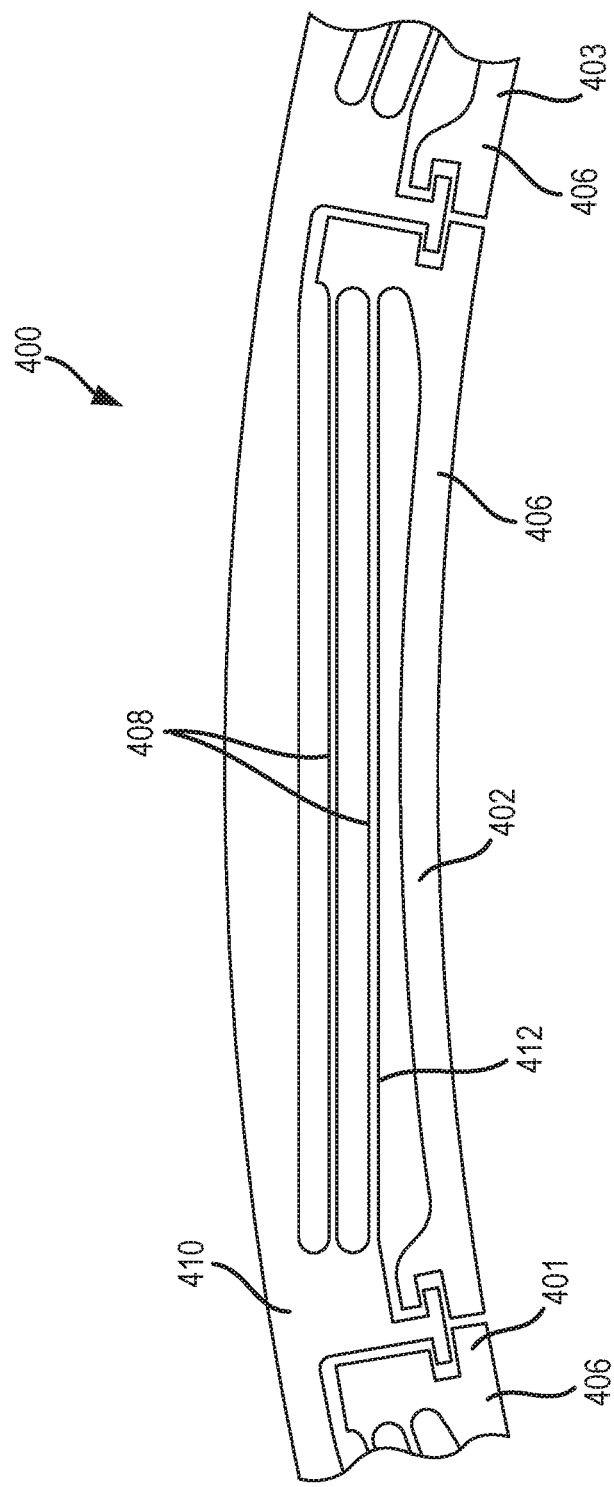
FIG. 4 illustrates an exemplary non-contact seal, in accordance with various embodiments.

A non-contact seal may be associated with the turbine section, the compressor section, or the fan section as illustrated in FIG. 1. FIG. 4 shows one example of a non-contact seal 400. The non-contact seal 400 as shown has shoes 406 and an outer ring 410. The outer ring 410 and the shoes 406 are generally formed from a single piece of metal, and may be cut as shown at 412 such that the combined non-contact seal 400 is formed into segments. As shown in FIG. 4, there are portions of three adjacent segments 401, 402, 403, which come together to form the overall non-contact seal 400. Shoes 406 may be coupled to outer ring 410 via arms 408. As shown, the cuts 412 may provide a gap that allows arms 408 to provide a spring force. Shoes 406 may move (e.g., radially) relative to outer ring 410 via arms 408. In various embodiments, non-contact seal 400 may be similar to seal 214 of FIG. 2A.

Figure 2A:
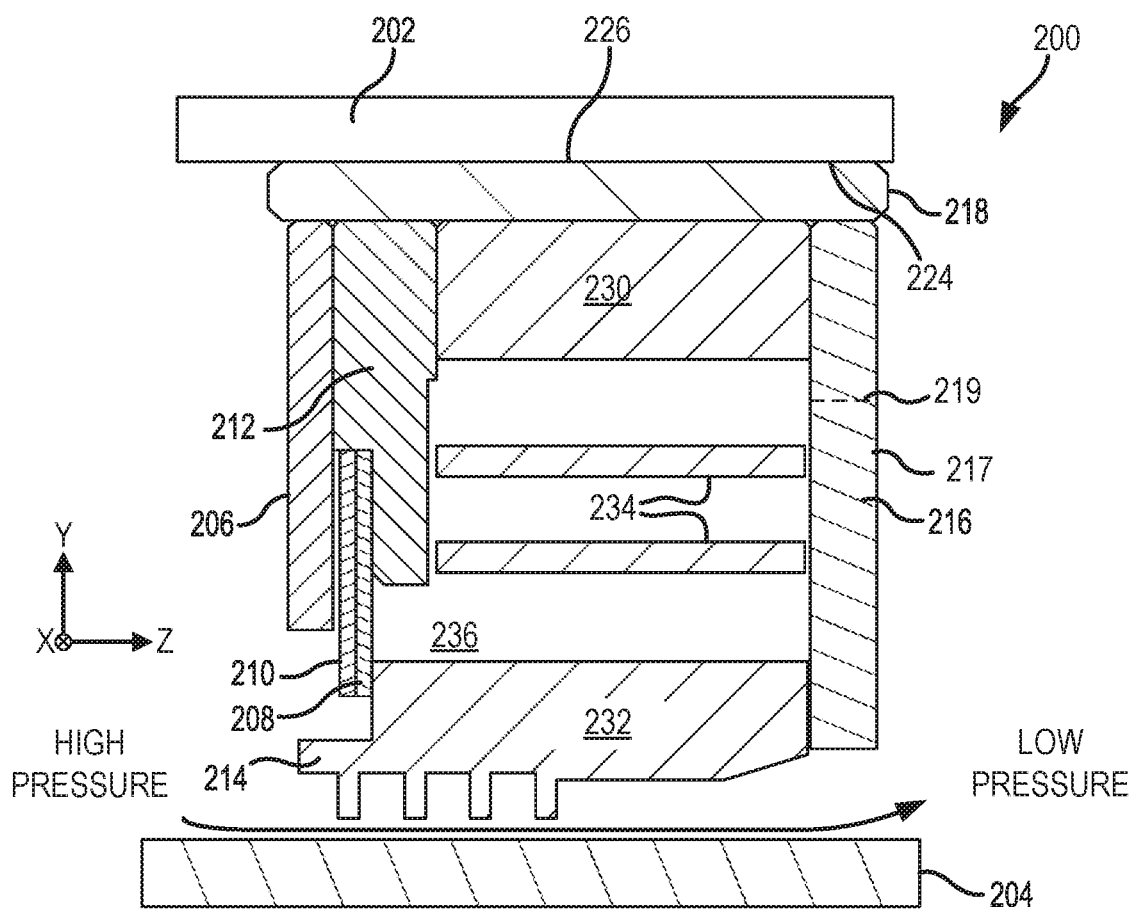
FIG. 2A illustrates a cross-section view of a seal arrangement installed within a static structure and over a shaft in a first position, in accordance with various embodiments.

With reference to FIG. 2A, a cross-section view of seal arrangement 200 in the installed position is illustrated, in accordance with various embodiments. Seal arrangement 200 may include seal 214, spacer 212, at least one secondary seal (i.e., first secondary seal 208 and/or second secondary seal 210), secondary seal cover 206, seal ring 216, and carrier ring 218. In various embodiments, static structure 202 may circumferentially surround seal arrangement 200. In various embodiments, seal arrangement 200 may be snapped into static structure 202. In various embodiments, secondary seal cover 206 may be snapped into carrier ring 218. In various embodiments, seal ring 216 may be snapped into carrier ring 218. In various embodiments, spacer 212 may be snapped into carrier ring 218. In various embodiments, seal 214 may be snapped into carrier ring 218. In various embodiments, seal ring 216 may be snapped into carrier ring 218. Seal arrangement 200 may circumferentially surround shaft 204. In various embodiments, seal 214 may comprise a non-contact seal. In this regard, seal 214 may be configured to not physically contact shaft 204. Stated differently, seal 214 may be configured to maintain a gap between shaft 204 and shoe 232.

Figure 3:
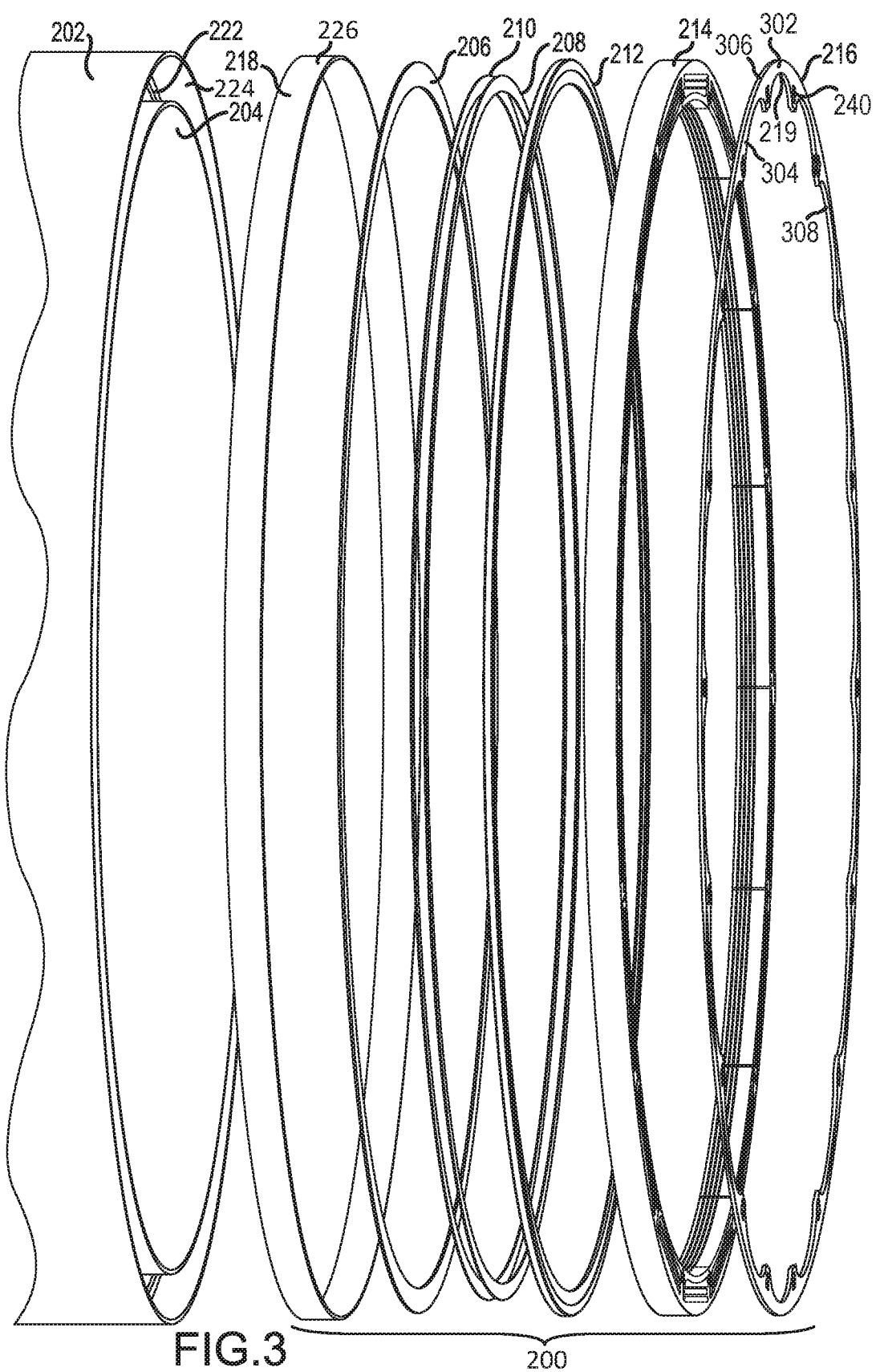
FIG. 3 illustrates an exploded perspective view of the seal arrangement of FIG. 2A, in accordance with various embodiments.

With combined reference to FIG. 2A and FIG. 3, carrier ring 218 may comprise a distal surface 226. Static structure 202 may comprise a proximal surface 224. Distal surface 226 may be in contact proximal surface 224. In various embodiments, carrier ring 218 may be snapped into static structure 202. In various embodiments, carrier ring 218 may be threaded into static structure 202.

As illustrated in FIG. 3, seal 214, spacer 212, first secondary seal 208, second secondary seal 210, secondary seal cover 206, seal ring 216, and/or carrier ring 218 may comprise an annular geometry. Seal 214, spacer 212, first secondary seal 208, second secondary seal 210, secondary seal cover 206, seal ring 216, and/or carrier ring 218 may be rings.

Seal ring 216 may comprise an annular body 302. Annular body 302 may comprise a first side surface 304, a second side surface (opposite the first side surface 304), an outer surface 306, and an inner surface 308. A plurality of window openings 240 are disposed in the annular body 302. The plurality of window openings 240 extend through annular body 302 from the first side 304 to the second side. The plurality of window openings 240 may be disposed circumferentially along annular body 302. A plurality of scalloped openings 219 may be disposed in the annular body 302. The plurality of scalloped openings 219 may be defined by inner surface 308.

With combined reference to FIG. 1 and FIG. 2A, shaft 204 may be mounted for rotation about engine central longitudinal axis X-X'. In various embodiments, shaft 204 may comprise low speed spool 12. In various embodiments, shaft 204 may comprise high speed spool 14. In various embodiments, shaft 204 comprises any suitable rotating shaft incorporating a non-contact seal.

Figure 2B:
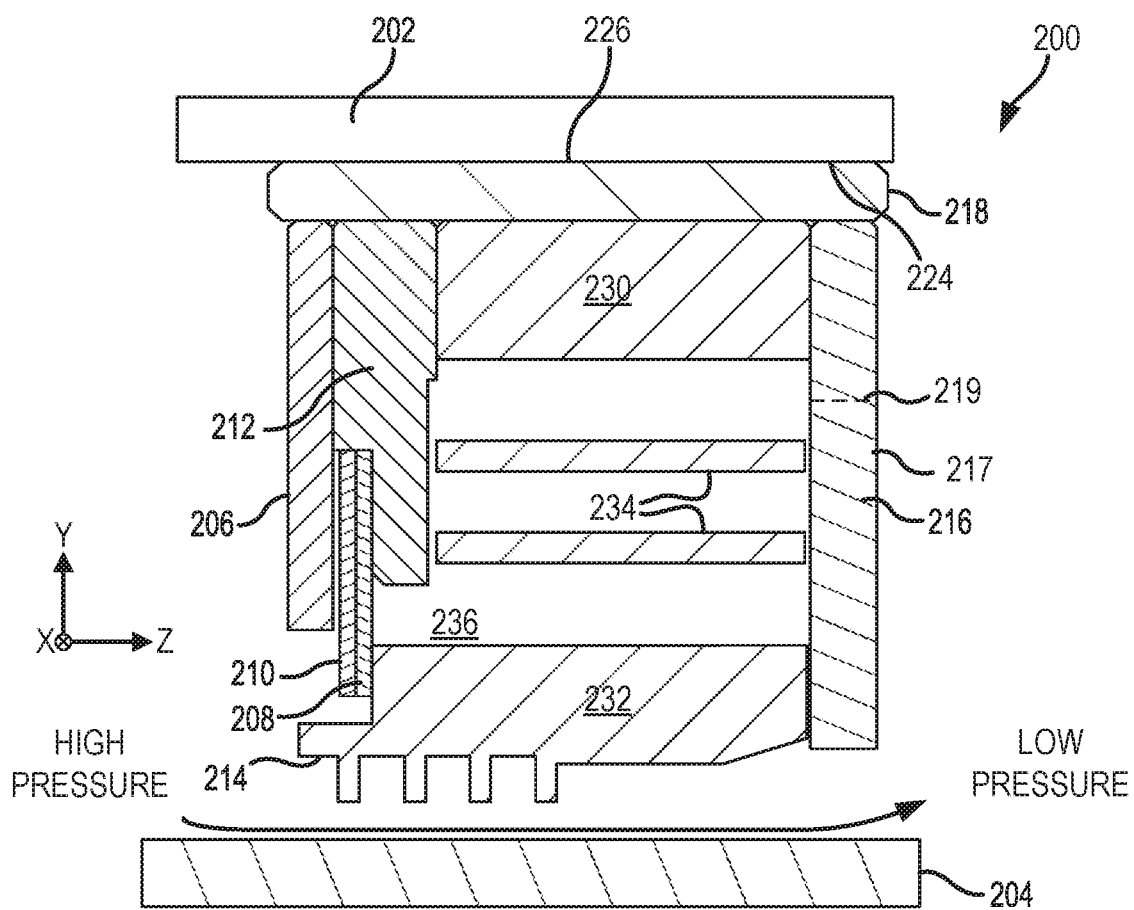
FIG. 2B illustrates the seal arrangement of FIG. 2A in a second position, in accordance with various embodiments.

With reference to FIG. 2A, a fluid, such as air for example, may travel from the high pressure side of seal arrangement 200 to the low pressure side of seal arrangement 200. First secondary seal 208 and second secondary seal 210 may prevent fluid from high pressure side of seal arrangement 200 from entering gap 236 of seal 214. In various embodiments, seal ring 216 may comprise a scalloped ring 217. Seal ring 216 may be made from a metal or metal alloy. In this regard, seal ring 216 may comprise a plurality of scalloped openings 219 which allow fluid from low pressure side of seal arrangement 200 into gap 236 of seal 214. As described in further detail in FIG. 4, seal 214 may comprise a shoe 232 attached to outer ring 230 via arms 234. In this regard, it should be appreciated that the pressure gradient across seal 214 may act to move shoe 232 in the radial direction (Y-direction) with respect to outer ring 230. Said movement may aid in preventing shoe 232 from contacting shaft 204. In the illustrated embodiments, FIG. 2A illustrates seal 214 in a first position and FIG. 2B illustrates seal 214 in a second position, wherein with the shoe 232 of seal 214 is moved closer to outer ring 230 in the second position than in the first position.

With reference to FIG. 5, seal 214 is illustrated in an installed position with shoes 232 moved to an inboard position. In the inboard position, shoes 232 are moved radially inward (negative Y-direction) with respect to outer ring 230 in their neutral state. Shoes 232 may be moved to the inboard position in response to the spring-like bias of the arms 234. Seal ring 216 is disposed axially adjacent seal 214. Seal ring 216 comprises scalloped openings 219. Seal ring 216 may further define window openings 240 through seal ring 216. Window openings 240 may provide access to seal 214 in the installed position. Seal 214 may comprise a plurality of stops 238 disposed between shoes 232. In particular, window openings 240 may provide access to a stop 238 of seal 214. In this regard, each window openings 240 may correspond to a stop 238. In the installed position, window openings 240 may be axially aligned with stop 238. In the installed position, window openings 240 may be circumferentially aligned with stop 238. Each window opening 240 may be sized in accordance with a distance D between shoes 232 to provide sufficient access to a gap 292 between stop 238 and shoe 232. For example, window opening 240 may comprise a width W which is substantially equal to distance D between adjacent shoes 232 at stop 238. However, it is contemplated that width W may be slightly greater, equal to, or slightly less than distance D, depending on the desired accessibility to gap 292. Likewise, a height H of window opening 240 may be sized to provide sufficient access to gap 292. Although referred to herein generally as a gap 292, it is appreciated that there is one gap 292 on either side of stop 238 to which window opening 240 provides access, as illustrated in FIG. 5. In various embodiments, window openings 240 may be shaped as polygons, circles, ovals, or any other suitable geometry. Stop 238 may extend radially inward from outer ring 230. Stop 238 may comprise a "T" shape cross-section. Stop 238 may physically block shoe 232 from moving too far inboard.

In various embodiments, each window opening 240 is disposed circumferentially between a first scalloped opening 219 and a second scalloped opening 219. Likewise, each second scalloped opening 219 is disposed circumferentially between a first window opening 240 and a second window opening, in accordance with various embodiments.

With combined reference to FIG. 5 and FIG. 6, a gap 292 may be formed between stop 238 and shoe 232. Stated differently, gap 292 may be defined by seal 214 between stop 238 and shoe 232. Gap 292 may increase as shoe 232 moves radially outward. Gap 292 may decrease as shoe 232 moves radially inward. With particular focus on FIG. 6, seal 214 may be prepared for installation by applying a force 294 in an outboard (i.e., radially outward) direction to shoe 232, thereby increasing the gap 292 between shoe 232 and stop 238. While force 294 is applied, a melting element 250 may be placed into the gap 292 and in between shoe 232 and stop 238 to hold shoe 232 in the outboard position. The force 294 may then be removed from shoe 232 and melting element 250 will hold shoe 232 in the outboard position. Stated differently, melting element 250 may secure shoe 232 in the outboard position. In this manner, shoe 232 may be held in the outboard position to aid in ease of installation of seal 214 over a shaft. Although referred to herein generally as a single melting element 250 being moved through window opening 240 into gap 292, it is appreciated that two melting elements 250 may be passed through window opening 240—namely one melting element 250 on either side of stop 238 which secures each associated shoe 232, as illustrated in FIG. 6. In this regard, each shoe 232 may be secured by a first melting element 250 at one end and may be secured by a second melting element 250 at the opposite end, as illustrated in FIG. 6. In this regard, each window opening 240 may provide access to two adjacent shoes 232.

In various embodiments, it is contemplated herein that—instead of using a single melting element 250 to secure each end of shoe 232 in the outboard position—a plurality of melting elements 250 may be stacked together, like shims, to achieve a desired radial position of shoe 232.

Melting element 250 may comprise any suitable material that has a melting-point temperature such that melting element 250 will melt and/or dissolve in response to heat from engine operation. In various embodiments, melting element 250 may comprise a melting-point temperature of 250° F. (121° C.) or less. In various embodiments, melting element 250 may comprise a melting-point temperature of between 80° F. (26.7° C.) and 250° F. (121° C.). In various embodiments, melting element 250 may comprise a melting-point temperature of between 100° F. (37.8° C.) and 160° F. (71° C.). After the melting element 250 melts, the melting element 250 may partially or fully exit the gap 292 to allow shoe 232 to freely move with respect to stop 238 during operation. In various embodiments, melting element 250 may comprise a wax material, such as a plant wax, an animal wax, a petroleum derived wax, a polyethylene wax, among others. In various embodiments, melting element 250 may comprise a thermoplastic material, such as low-density polyethylene for example, among others.

Figure 7:
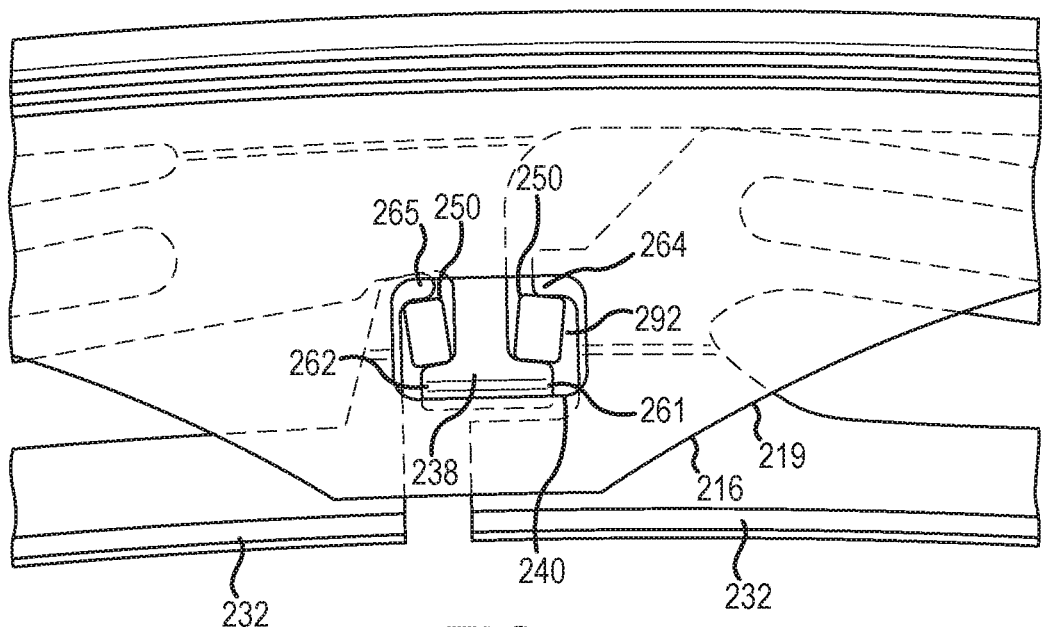
FIG. 7 illustrates an enlarged view of the seal arrangement of FIG. 6 with melting elements in the installed position, in accordance with various embodiments.

With reference to FIG. 7, an enlarged view of seal ring 216 with shoes 232 in an outboard position is illustrated, in accordance with various embodiments. In various embodiments, stop 238 may comprise a first stop tab 261 and a second stop tab 262. In various embodiments, seal 214 may comprise a first seal tab 264 and a second seal tab 265. Melting element 250 may be disposed between first stop tab 261 and first seal tab 264. Melting element 250 may be disposed between second stop tab 262 and second seal tab 265. First stop tab 261 may be radially aligned with first seal tab 264. Second stop tab 262 may be radially aligned with second seal tab 265.

Melting element 250 is moved into gap 292 after seal 214 is installed into carrier ring 218 (see FIG. 2A) with seal ring 216 in the installed position immediately axially adjacent seal 214, as illustrated. In various embodiments, carrier ring 218 may be heated prior to being snapped onto seal 214 and/or seal ring 216. Thus, the melting element 250 is installed between shoe 232 and stop 238 after seal 214 and seal ring 216 are installed into carrier ring 218 so that melting element 250 is not dissolved during installation of seal 214 and/or seal ring 216, which may include heating carrier ring 218. Furthermore, in various embodiments, melting element 250 may be installed between shoe 232 and stop 238 after carrier ring 218 is installed into static structure 202 so that melting element 250 is not dissolved during installation of carrier ring 218, which may include applying heat to static structure 202. In this regard, seal ring 216 is installed adjacent to seal 214 prior to placement of melting element 250 between stop 238 and shoe 232. Thus, window openings 240 in seal ring 216 are desirable for accessing seal 214 for installation of melting element 250.

Figure 8:
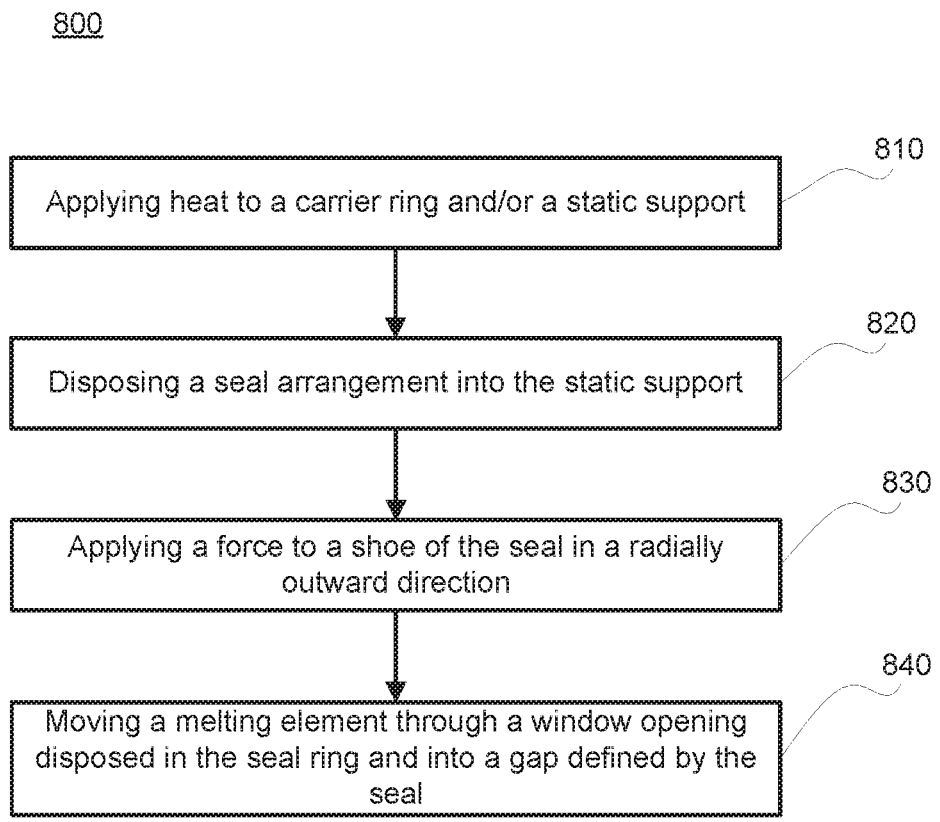
FIG. 8 illustrates a method for assembling a seal arrangement, in accordance with various embodiments.

With reference to FIG. 8, a method 800 for assembling a seal arrangement is provided, in accordance with various embodiments. Method 800 includes applying heat to a carrier ring and/or a static support (step 810). Method 800 includes disposing a seal arrangement into the static support (step 820). Method 800 includes applying a force to a shoe of the seal in a radially outward direction (step 830). Method 800 includes moving a melting element through a window opening disposed in the seal ring and into a gap defined by the seal (step 840).

With combined reference to FIG. 2A and FIG. 8, step 810 may include applying heat to carrier ring 218 and/or static support piece 202. Step 820 may include disposing carrier ring 218 into static support piece 202. Step 820 may include disposing seal 214 into carrier ring 218 and/or static support piece 202. Step 820 may include disposing seal ring 216 into carrier ring 218 and/or static support piece 202. Seal 214 and seal ring 216 may be moved axially with respect to carrier ring 218 and/or static support piece 202 during step 820. With combined reference to FIG. 6 and FIG. 8, step 830 may include applying a force 294 to shoe 232 in a radially outward direction. Step 830 may be performed by hand or using a tool. Step 840 may include moving melting element 250 through window opening 240 and gap 292. Step 840 may be performed after seal 214 and carrier ring 218 have cooled down (e.g., to room temperature) from step 810.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal arrangement, comprising:
a carrier ring;
a seal disposed within the carrier ring, wherein the seal comprises an outer ring, a first shoe coupled to the outer ring, a second shoe coupled to the outer ring, and a stop extending from the outer ring, wherein radial movement of at least one of the first shoe and the second shoe is configured to be limited by the stop;
a seal ring disposed within the carrier ring and axially adjacent the seal;
wherein the seal ring comprises:
an annular body comprising a first side surface, a second side surface, an outer surface, and an inner surface; and
a plurality of window openings disposed in the annular body, wherein each of the plurality of window openings extends through the annular body from the first side surface to the second side surface, and
each of the plurality of window openings is configured to provide access to the non-contact seal, whereby a melting element is adjacent to the stop and the melting element is moved through the plurality of window openings to the non-contact seal to hold the first shoe in an outboard position.

2. The seal arrangement of claim 1, further comprising a plurality of scalloped openings defined by the inner surface.

3. The seal arrangement of claim 2, wherein the plurality of window openings includes a first window opening and a second window opening, and the plurality of scalloped openings includes a first scalloped opening and a second scalloped opening, wherein the first window opening is disposed circumferentially between the first scalloped opening and the second scalloped opening, and the second scalloped opening is disposed circumferentially between the first window opening and the second window opening.

4. The seal arrangement of claim 1, wherein the seal comprises a plurality of stops, the plurality of window openings corresponding to the plurality of stops, and the plurality of stops includes the stop.

5. The seal arrangement of claim 4, wherein the plurality of window openings is configured to provide access to a gap defined by the seal.

6. The seal arrangement of claim 1, the plurality of window openings is disposed circumferentially about the seal ring.

7. A seal ring for a non-contact seal, comprising:
an annular body comprising a first side surface, a second side surface, an outer surface, and an inner surface; and
a plurality of window openings disposed in the annular body,
wherein the plurality of window openings is configured to provide access to the non-contact seal, whereby a melting element is adjacent to a stop, and whereby the melting element is moved through the plurality of window openings to the non-contact seal.

8. The seal ring of claim 7, wherein the plurality of window openings extends through the annular body from the first side to the second side.

9. The seal ring of claim 8, further comprising a plurality of scalloped openings defined by the inner surface.

10. The seal ring of claim 9, wherein the plurality of window openings includes a first window opening and a second window opening, and the plurality of scalloped openings includes a first scalloped opening and a second scalloped opening, wherein the first window opening is disposed circumferentially between the first scalloped opening and the second scalloped opening, and the second scalloped opening is disposed circumferentially between the first window opening and the second window opening.

11. The seal ring of claim 7, wherein the plurality of window openings corresponds to a plurality of stops of the non-contact seal.

12. The seal ring of claim 11, wherein the plurality of window openings is sized in accordance with a distance between a first shoe and a second shoe of the non-contact seal.

13. The seal ring of claim 7, the plurality of window openings is disposed circumferentially about the seal ring.

14. A method for assembling a seal arrangement comprising:
applying heat to at least one of a carrier ring and a static support piece;
disposing a seal arrangement into the static support piece;
applying a force to a shoe of the seal in a radially outward direction; and
moving a melting element through a window opening disposed in the seal ring and into a gap defined by the seal, wherein the melting element is adjacent to a stop.

15. The method of claim 14, further comprising moving the melting element into the gap.

16. The method of claim 15, wherein applying the force to the shoe moves the shoe to an outboard position.

17. The method of claim 16 wherein the melting element secures the shoe in the outboard position.

18. The method of claim 14, wherein the melting element comprises at least one of a wax material and a plastic material.

19. The method of claim 17, further comprising removing the force from the shoe, wherein the melting element secures the shoe in the outboard position in response to the force being removed.

* * * * *